(12) United States Patent
Foshage

(10) Patent No.: US 6,770,995 B1
(45) Date of Patent: Aug. 3, 2004

(54) PASSIVE RADIAL MAGNETIC BEARING

(76) Inventor: Gerald K. Foshage, 74 Pinehurst Dr., Boxford, MA (US) 01921

( * ) Notice: Subject to any disclaimer, the term of this patent is extended or adjusted under 35 U.S.C. 154(b) by 0 days.

(21) Appl. No.: 10/396,750

(22) Filed: Mar. 25, 2003

Related U.S. Application Data

(63) Continuation of application No. 09/960,044, filed on Sep. 22, 2001, now abandoned.

(51) Int. Cl.$^7$ ............................................. H02K 7/09
(52) U.S. Cl. .................................................. 310/90.5
(58) Field of Search ........................ 310/90.5; 384/8, 384/446, 133

(56) References Cited

U.S. PATENT DOCUMENTS

| | | | | | |
|---|---|---|---|---|---|
| 2,747,944 A | * | 5/1956 | Baermann | .................. | 310/90.5 |
| 3,890,019 A | * | 6/1975 | Boden et al. | ............. | 310/90.5 |
| 4,268,095 A | * | 5/1981 | Millner | ...................... | 310/90.5 |
| 4,316,394 A | * | 2/1982 | Dohogne | .................... | 74/5.46 |
| 4,609,332 A | * | 9/1986 | Miki et al. | .................. | 417/352 |
| 4,717,315 A | * | 1/1988 | Miki et al. | .................. | 417/365 |
| 4,837,474 A | * | 6/1989 | Petersen et al. | ............ | 310/254 |
| 5,196,748 A | * | 3/1993 | Rigney | ...................... | 310/90.5 |
| 5,220,232 A | * | 6/1993 | Rigney et al. | ............. | 310/90.5 |
| 5,481,146 A | * | 1/1996 | Davey | ....................... | 310/90.5 |
| 5,521,448 A | * | 5/1996 | Tecza et al. | ............... | 310/90.5 |
| 5,959,382 A | * | 9/1999 | Dauwalter | ................. | 310/90.5 |
| 6,448,679 B1 | * | 9/2002 | Imlach | ...................... | 310/90.5 |

* cited by examiner

Primary Examiner—Tran Nguyen
Assistant Examiner—J. Aguirrechea
(74) Attorney, Agent, or Firm—Woodcock Washburn LLP

(57) ABSTRACT

A presently-preferred magnetic bearing comprises a rotor disk having a first plurality of concentric teeth extending from a surface thereof, and a stator disk having a second plurality of concentric teeth extending from a surface thereof. The first and the second plurality of concentric teeth are spaced apart by a gap that permits a primary magnetic flux to flow between the first and the second plurality of concentric teeth substantially in a first direction. Then magnetic bearing also comprises a plurality of flux focusing magnets fixedly coupled to at least one of the surface of the rotor disk and the surface of the stator disk. The flux focusing magnets produce a secondary magnetic flux that flows substantially in a second direction substantially opposite the first direction.

17 Claims, 6 Drawing Sheets

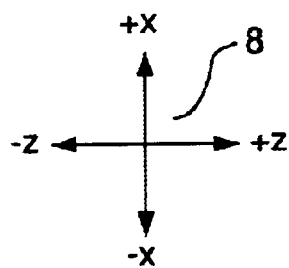
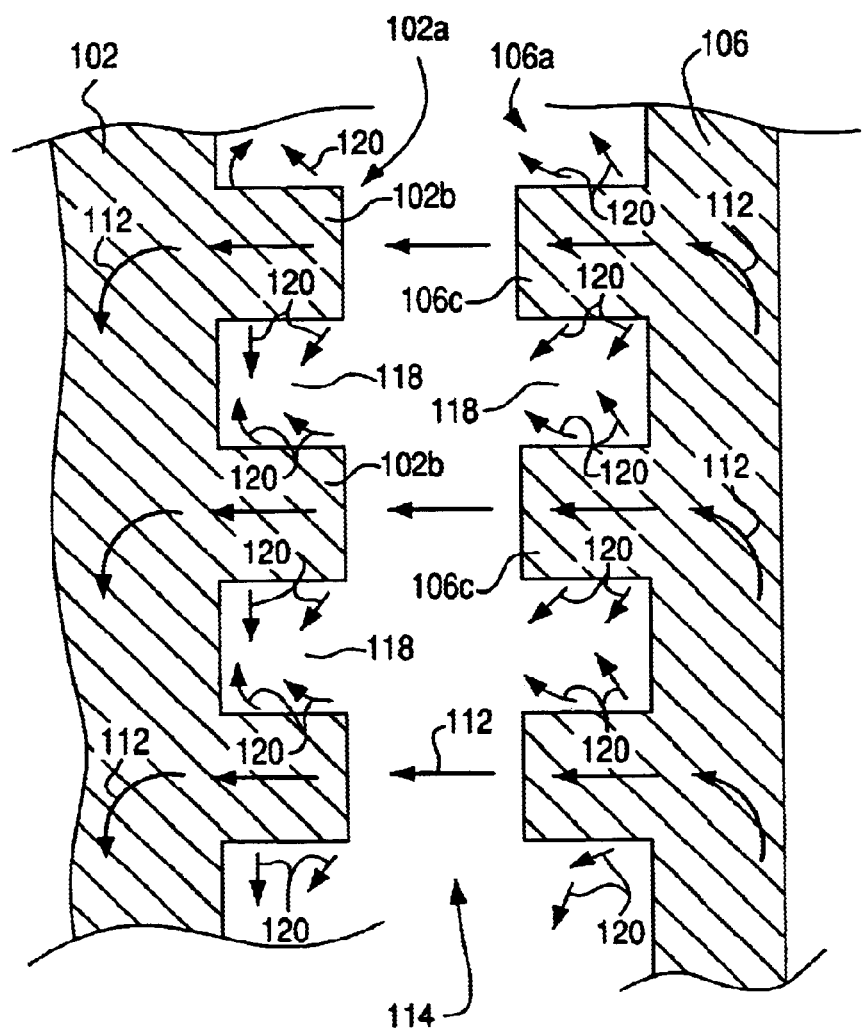
FIG. 6
(Prior Art)

PASSIVE RADIAL MAGNETIC BEARING

"This application is a continuation of Ser. No. 09/960,044 filed Sep. 22, 2001, now abandoned the entirety of which is incorporated herein by reference."

FIELD OF THE INVENTION

The present invention relates to magnetic bearings for levitating or suspending a rotatable component. More specifically, the invention relates to a magnetic bearing that provides radial positioning of a rotatable component on a passive basis to facilitate rotation of the component about a predetermined axis.

BACKGROUND OF THE INVENTION

Magnetic bearings are commonly used to levitate or suspend rotatable components, e.g., flywheels, and thereby facilitate rotation of the component about a predetermined axis. Magnetic bearings provide substantial advantages in relation to mechanical bearings. For example, magnetic bearings facilitate substantially friction-free operation, and thus function without most of parasitic energy losses that occur in virtually all mechanical bearings.

Magnetic bearings are classified as "active" or "passive." Active magnetic bearings usually comprise one or more electromagnets that create return forces. A typical active magnetic bearing also comprises one or more position sensors that operate in conjunction with a servo control system. The servo control system varies the current passing through the electromagnets in a manner that causes the return forces to suspend and align the rotatable member along a desired axis of rotation.

Passive magnetic bearings typically comprise one or more permanent magnets fixed to the rotating or static components of the bearing. The permanent magnets produce attractive or repulsive forces that bias the rotating component toward or along a desired axis of rotation. Passive magnetic bearings, in general, are lighter, smaller, less complex, less expensive, and more reliable than active bearings of similar capability. A passive magnetic bearing, however, cannot provide stable positioning of the rotatable member in the radial and axial directions, i.e., with respect a set of orthogonal axes one of which extends along the desired axis of rotation. Passive magnetic bearings, therefore, are typically used in conjunction with one or more active bearings.

So-called "centering bearings" represent a particular type of passive magnetic bearing. Centering bearings exert a radial force on a rotatable member that biases the rotatable member toward a desired axis of rotation. One possible embodiment of a conventional centering bearing 100 is depicted in cross-section in FIGS. 5 and 6.

The bearing 100 comprises a first stator disk 102 and a second stator disk 104. The bearing 100 further comprises a rotor disk 106. The rotor disk 106 is fixedly coupled to a shaft 109 that supports a rotatable component such as a flywheel.

The stator disks 102, 104 and the rotor disk 106 are each formed from a soft ferromagnetic material. The stator disk 102 includes a major surface 102a having a plurality of concentric raised portions, or teeth 102b, formed thereon. The teeth 102b each form a continuous ring, i.e., the teeth 102b each extend through a continuous arc of 360 degrees. The stator disk 104 likewise includes a major surface 104a having a plurality of concentric teeth 104b formed thereon.

The rotor disk 106 has a first surface 106a and a second surface 106b. The first surface 106a has a plurality of concentric teeth 106c formed thereon. The second surface 106b likewise has a plurality of concentric teeth 106d formed thereon. The geometry, i.e., the size and shape, of each tooth 106c substantially matches that of a corresponding tooth 102b on the stator disk 102. The geometry of each tooth 106d substantially matches that of a corresponding tooth 104b on the stator disk 104.

The rotor disk 106 is positioned between the stator disks 102, 104, as shown in FIG. 5. More particularly, the rotor disk 106 is positioned so that the first surface 106a faces the surface 102a of the stator disk 102 across an axial gap 114. The second surface 106b likewise faces the surface 104a of the stator disk 104 across an axial gap 116.

The bearing 100 further comprises a ring-shaped permanent magnet 110 having a north pole 110a and a south pole 110b. The magnet 110 is fixed to a non-magnetizable mounting surface 108. In addition, the magnet 110 is fixedly coupled to the stator disks 102, 104 so that the north pole 110a is positioned proximate the stator disk 104, and the south pole 110b is positioned proximate the stator disk 102.

The noted arrangement of the magnet 110, stator disks 102, 104, and rotor disk 106 produces a magnetic-flux circuit within the bearing 100. The primary direction of flow of the magnetic flux is denoted by arrows 112 included in FIG. 5 (the arrows 112 are not depicted in the lower portion of FIG. 5, for clarity). The magnetic flux flows from the north pole 110a into the stator disk 104. The magnetic flux travels through the stator disk 104, and is at least partially focused in the teeth 104b. The magnetic flux flows from the teeth 104b, across the gap 116, and into to the teeth 106d.

The magnetic flux flows through the rotor disk 106, and is at least partially focused in the teeth 106c. The magnetic flux flows from the teeth 106c, across the gap 114, and into the teeth 102b on the stator disk 102. The magnetic flux subsequently flows through the stator disk 102 and into south pole 110b of the magnet 110, thereby completing the magnetic circuit.

The noted flow of magnetic flux through the magnetic bearing 100, in conjunction with the geometry and arrangement of the stator disks 102, 104 and the rotor disk 106, produces a centering effect on the shaft 109. More particularly, the magnetic flux causes the teeth 102b on the first stator disk 102 to substantially align with the teeth 106c on the rotor disk 106. The magnetic flux likewise causes the teeth 104b on the second stator disk 104 to substantially align with the teeth 106d on the rotor disk 106. This phenomenon is based on the principle that the magnetic flux seeks a path of minimum reluctance.

Minimum reluctance in the flux circuit is achieved when the gaps 114, 116 are minimized, i.e., when the distances that the flux must travel to reach the first stator disk 102 from the surface 106a of the rotor, or to reach the rotor 106 from the surface 104a of the stator disk 104, are minimized. Minimization of the gap 114 occurs when the teeth 102b are substantially aligned with the teeth 106c. Minimization of the gap 116 likewise occurs when the teeth 104b are substantially aligned with the teeth 106d (as shown in FIG. 5).

Hence, the magnetic flux flowing through the bearing 100, in attempting to define a flow path of minimal reluctance, produces a magnetomotive force that urges each of the teeth 106c, 106d into substantial alignment with a corresponding tooth 102b, 104b. Aligning the teeth 102b, 104b, 106c, 106d suspends the shaft 109 and substantially aligns the shaft 109 with a predetermined axis extending in the "z" direction, thereby permitting the shaft 109 to rotate about that axis (the noted axis is denoted "C1," and the direction of rotation is indicated by the arrow 126 in FIG. 5). The resistance of the shaft 109 to radial displacement away from the predetermined axis is commonly referred to as the "stiffness" of the bearing 100, and is proportionate to the above-noted magnetomotive produced by the flow of magnetic flux through the teeth 102b, 104b, 106c, 106d.

The magnetic-flux circuit in the bearing 100 is subject to various losses. In other words, only a portion of the magnetic flux available from the permanent magnet 110 is available to suspend and align the shaft 109. The teeth 102b, 104b, 106c, 106d represent one source of flux loss. In particular, a portion of the magnetic flux that enters each tooth 102b, 104b, 106c, 106d escapes into the space between adjacent teeth 102b, 104b, 106c, 106d.

For example, FIG. 6 is a magnified view depicting a plurality of the teeth 102b, 106c. Adjacent one of the teeth 102b define valleys 118 located between the adjacent teeth 102b. Adjacent teeth 106c likewise form valleys 118 located between the adjacent teeth 102b. A portion of the magnetic flux passing through the teeth 102b, 106c escapes from the teeth 102b, 106c and into the neighboring valleys 118. This flux leakage is denoted by the arrows 120 included in FIG. 6. The magnetic flux that leaks or escapes from each of the teeth 106c in this manner does flow directly to a corresponding tooth 102b on the stator disk 102. Hence, this flux does not contribute substantially to the suspension and centering of the shaft 109. The capacity of the permanent magnet 110 must therefore be greater than otherwise required to account for the noted flux leakage.

Increasing the capacity of a permanent magnet in a magnetic bearing typically results in a corresponding increase in the size, weight, and expense of the permanent magnet (and the magnetic bearing). Hence, minimizing the flux leakage from the magnetic circuit of a bearing can lead to substantial reductions in the size, weight, and cost of the bearing. An ongoing need therefore exists for a passive radial magnetic bearing having features that minimize the leakage of magnetic flux therefrom.

SUMMARY OF THE INVENTION

A presently-preferred embodiment of radial magnetic bearing comprises a rotor disk having a first plurality of concentric teeth extending from a surface thereof, and a stator disk having a second plurality of concentric teeth extending from a surface thereof. The second plurality of concentric teeth is spaced apart from the first plurality of concentric teeth by a gap that permits a primary magnetic flux to flow between the first and the second plurality of concentric teeth substantially in a first direction.

The magnetic bearing also comprises a primary magnet magnetically coupled to at least one of the rotor disk and the stator disk and being adapted to provide the primary magnetic flux. The magnetic bearing further comprises a plurality of flux focusing magnets fixedly coupled to at least one of the surface of the rotor disk and the surface of the stator disk and producing a secondary magnetic flux that flows substantially in a second direction substantially opposite the first direction.

Another presently-preferred embodiment of radial magnetic bearing comprises a rotor disk adapted to rotate about a predetermined axis and having a first and a second circumferentially-extending raised portion projecting from a surface thereof, and a stator disk axially spaced from the rotor disk and positioned around the predetermined axis. The stator disk has a third and a fourth circumferentially-extending raised portion projecting from a surface thereof. The radial magnetic bearing also comprises a permanent magnet magnetically coupled to at least one of the rotor disk and the stator disk and providing a primary magnetic flux, a first ring-shaped magnet positioned between the first and the second raised portions, and a second ring-shaped magnet positioned between the third and the fourth raised portions.

Another presently-preferred embodiment of radial magnetic bearing comprises a rotor disk having a first plurality of circumferentially-extending raised portions projecting from a major surface thereof, and a stator disk having a major surface that faces the major surface of the rotor disk. The major surface of the stator disk has a second plurality of circumferentially-extending raised portions projecting therefrom. The radial magnetic bearing also comprises a plurality of flux focusing magnets fixedly coupled to at least one of the major surfaces of the rotor disk and the stator disk.

Another presently-preferred embodiment of radial magnetic bearing comprises a rotor disk adapted to rotate about an axis of rotation and having a first plurality of circumferentially-extending raised portions formed thereon for conducting a primary magnetic flux substantially in a first direction. The radial magnetic bearing also comprises a stator disk positioned around the axis of rotation and axially spaced from the rotor disk. The stator disk has a second plurality of circumferentially-extending raised portions formed thereon for conducting the primary magnetic flux substantially in the first direction.

The radial magnetic bearing further comprises a primary magnet magnetically coupled to at least one of the rotor disk and the stator disk and being adapted to provide the primary magnetic flux. The radial magnetic bearing also comprises a first plurality of flux focusing magnets each being positioned between adjacent ones of the first plurality of raised portions and each being polarized in a direction substantially opposite the first direction, and a second plurality of flux focusing magnets each being positioned between adjacent ones of the second plurality of raised portions and each being polarized in the direction substantially opposite the first direction

BRIEF DESCRIPTION OF THE DRAWINGS

For the purpose of illustrating the invention, the drawings show an embodiment that is presently preferred. The invention is not limited, however, to the specific instrumentalities disclosed in the drawings. In the drawings:

FIG. 6 is a magnified view of the area designated "D" in FIG. 5.

DESCRIPTION OF PREFERRED EMBODIMENTS

Figure 1:
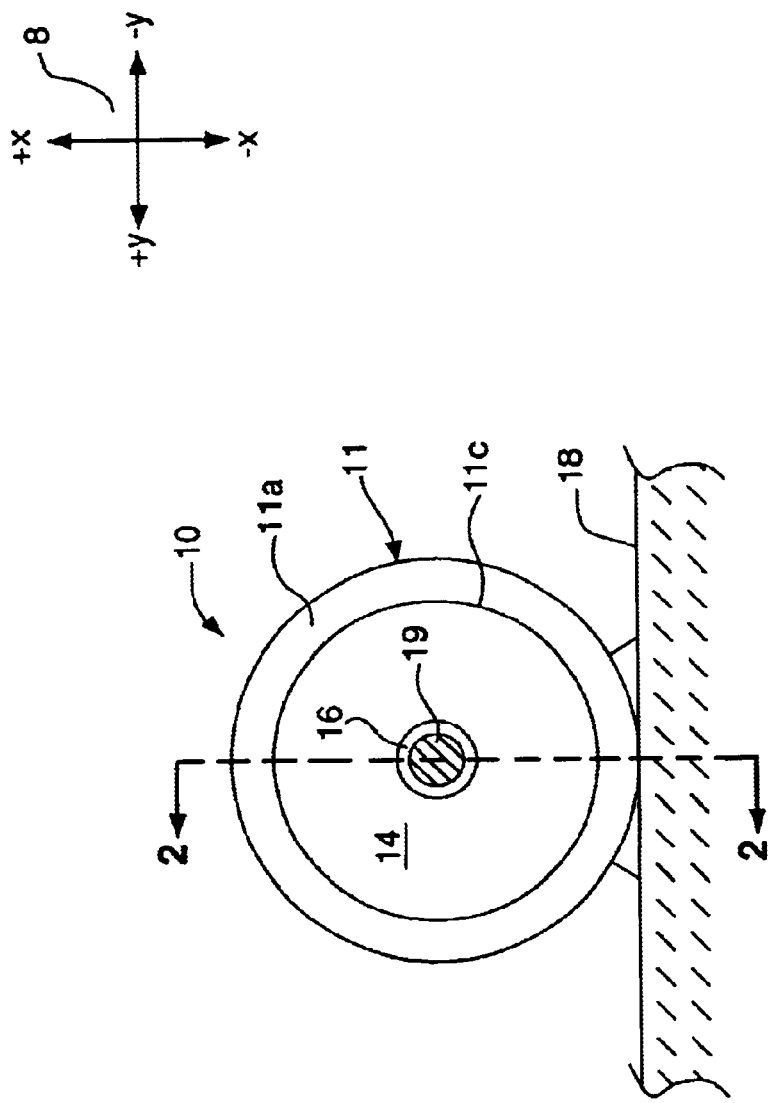
FIG. 1 is a diagrammatic side view of a passive radial magnetic bearing in accordance with the present invention.

FIGS. 1–4 depict a presently-preferred embodiment of a passive radial magnetic bearing 10. The figures are each referenced to a common coordinate system 8 depicted therein. The magnetic bearing 10 is adapted to suspend a rotatable component such as a flywheel, and to align the rotatable component with a predetermined axis of rotation (the axis of rotation is "C" in FIG. 2). The magnetic bearing 10, in a typical application, would be used in conjunction with one or more active magnetic bearing to provide stable rotation of the rotatable component about the axis of rotation. Details concerning these additional bearings are not necessary to an understanding of the invention, however, and therefore are not included herein.

The bearing 10 comprises a first stator disk 12 and a second stator disk 14. The bearing 10 further comprises a rotor disk 16. The rotor disk 16 is fixedly coupled to a shaft 19 that supports a rotatable component such as a flywheel. The direction of rotation of the shaft 19 is denoted by the arrow 31 included in FIG. 2.

The stator disks 12, 14 and the rotor disk 16 are preferably formed from a soft ferromagnetic material such as 2 vanadium permadur, very pure iron, or a high-permeability nickel-iron. The stator disk 12 includes a major surface 12a having a plurality of concentric raised portions, or teeth 12b, formed thereon. The teeth 12b each form a continuous ring, i.e., the teeth 12b each extend through a continuous arc of 360 degrees. Adjacent teeth 12b define a space, or valley 24 located between the adjacent teeth 12. The stator disk 14 likewise includes a major surface 14a having a plurality of concentric teeth 14b formed thereon, with adjacent teeth 14b defining one of the valleys 24. The significance of the valleys 24 is explained below.

The rotor disk 16 has a first surface 16a and a second surface 16b. The first surface 16a has a plurality of concentric teeth 16c formed thereon. The second surface 16b likewise has a plurality of concentric teeth 16d formed thereon. The geometry, i.e., the size, shape, and relative position, of each tooth 16c substantially matches that of a corresponding tooth 12b on the stator disk 12. The geometry of each tooth 16d substantially matches that of a corresponding tooth 14b on the stator disk 14. Adjacent ones of the teeth 16c, 16d define one of the valleys 24.

Figure 2:
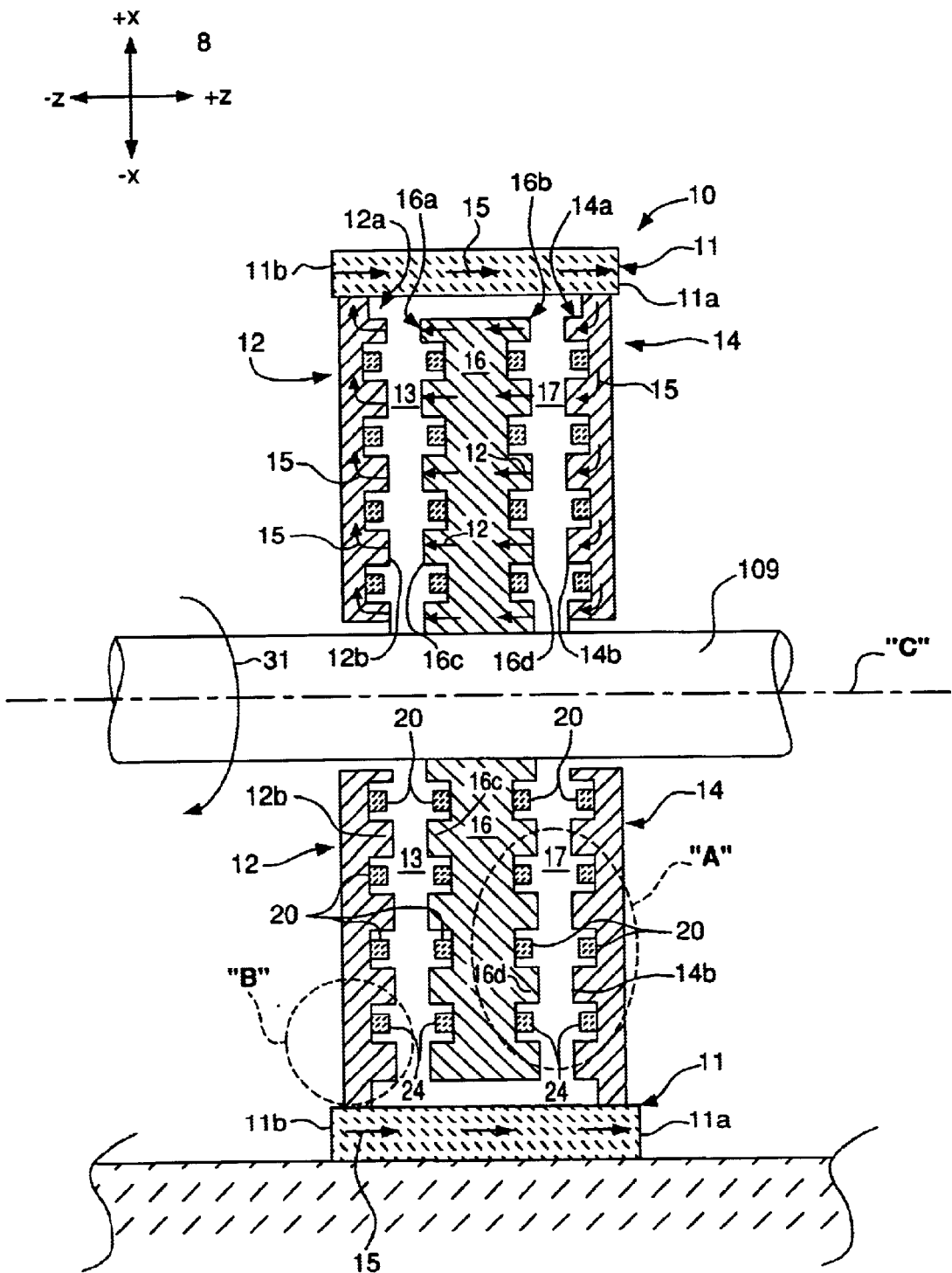
FIG. 2 is a diagrammatic cross-sectional view of the passive radial magnetic bearing shown in FIG. 1, taken along the line "2—2" of FIG. 1.

The rotor disk 16 is positioned between the stator disks 12, 14, as shown in FIG. 2. More particularly, the rotor disk 16 is positioned so that the first surface 16a faces the surface 12a of the stator disk 12 across an axial gap 13. (The "axial" direction, as referenced throughout the specification and claims, refers to the "z" direction denoted on the coordinate system 8.) The second surface 16b likewise faces the surface 14a of the stator disk 14 across an axial gap 17.

The bearing 10 further comprises a ring-shaped permanent magnet 11 having a north pole 11a and a south pole 11b. The magnet 11 is fixedly coupled to a non-magnetizable mounting surface 18. An inner circumferential surface 11c of the magnet 11 is fixedly coupled to a respective outer circumferential surface of the stator disk 12 and the stator disk 14 by conventional means such as bonding (see FIG. 1). The magnet 11 is positioned so that the so that the north pole 11a is located proximate the stator disk 14, and the south pole 11b is located proximate the stator disk 12. Note: The magnetic bearing 10 may include an outer casing or cover that houses the above-noted components; this casing or cover is not depicted in the figures, for clarity.

The noted arrangement of the magnet 11, stator disks 12, 14, and rotor disk 16 produces a magnetic-flux circuit within the bearing 10. The primary direction of flow of the magnetic flux is denoted by arrows 15 included in FIGS. 2 and 3 (the arrows 15 are not depicted in the lower portion of FIG. 2, for clarity). The magnetic flux flows from the north pole 11a into the stator disk 14. The magnetic flux travels through the stator disk 14, and is at least partially focused in the teeth 14b. The magnetic flux flows from the teeth 14b to the teeth 16d of the rotor disk 16 via the gap 17.

The magnetic flux subsequently flows through the rotor disk 16, and is at least partially focused in the teeth 16c. The magnetic flux flows from the teeth 16c to the teeth 12d of the stator disk 12 via the gap 13. The magnetic flux flows through the stator disk 12 and into south pole 11b of the magnet 11, thereby completing the magnetic circuit. Note: The above-described magnetic circuit is hereinafter referred to as the "primary magnetic circuit" of the bearing 10.

The noted flow of magnetic flux through the magnetic bearing 10, in conjunction with the geometry and arrangement of the stator disks 12, 14 and the rotor disk 16, produces a centering effect on the shaft 19. More particularly, the flux through the primary magnetic circuit causes the teeth 12b on the first stator disk 12 to substantially align with the teeth 16c on the rotor disk 16. The magnetic flux likewise causes the teeth 14b on the second stator disk 14 to substantially align with the teeth 16d on the rotor disk 16. This phenomenon, as explained previously, is due to the fact that the magnetic flux seeks a path of minimum reluctance. The noted alignment of the teeth 12b, 14b, 16c, 16d suspends the shaft 19 and substantially aligns the shaft 19 with the axis of rotation "C," thereby facilitating rotation of the shaft 19 (and the rotor disk 16) in relation to the stator plates 12, 14 and the mounting surface 18.

The magnetic bearing 10 further includes a plurality of flux focusing magnets 20. The flux focusing magnets 20 are positioned on the surfaces 12a, 14a, 16a, 16b of the respective stator disks 12, 14 and rotor disk 16, and within the valleys 24 formed by the teeth 12b, 14b, 16c, 16d. The flux focusing magnets 20, as explained in detail below, minimize flux leakage from the teeth 12b, 14b, 16c, 16d.

For clarity, the flux focusing magnets 20 are hereinafter described with reference to the flux focusing magnets 20 located on the second stator disk 14. This description, unless otherwise noted, applies equally to the flux focusing magnets 20 positioned on the first stator disk 12 and the rotor disk 16.

Figure 3:
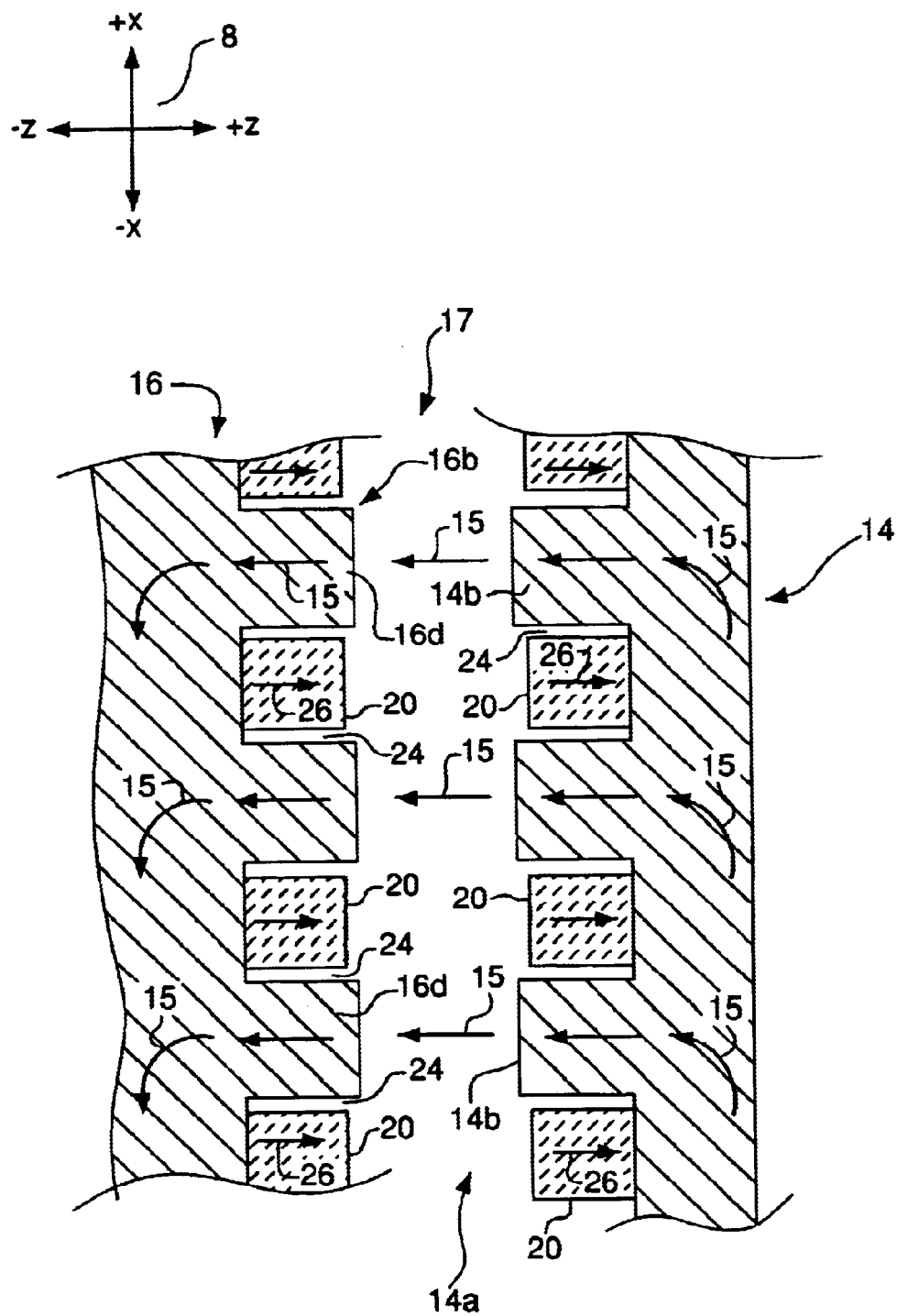
FIG. 3 is a magnified view of the area designated "A" in FIG. 2.
Figure 4:
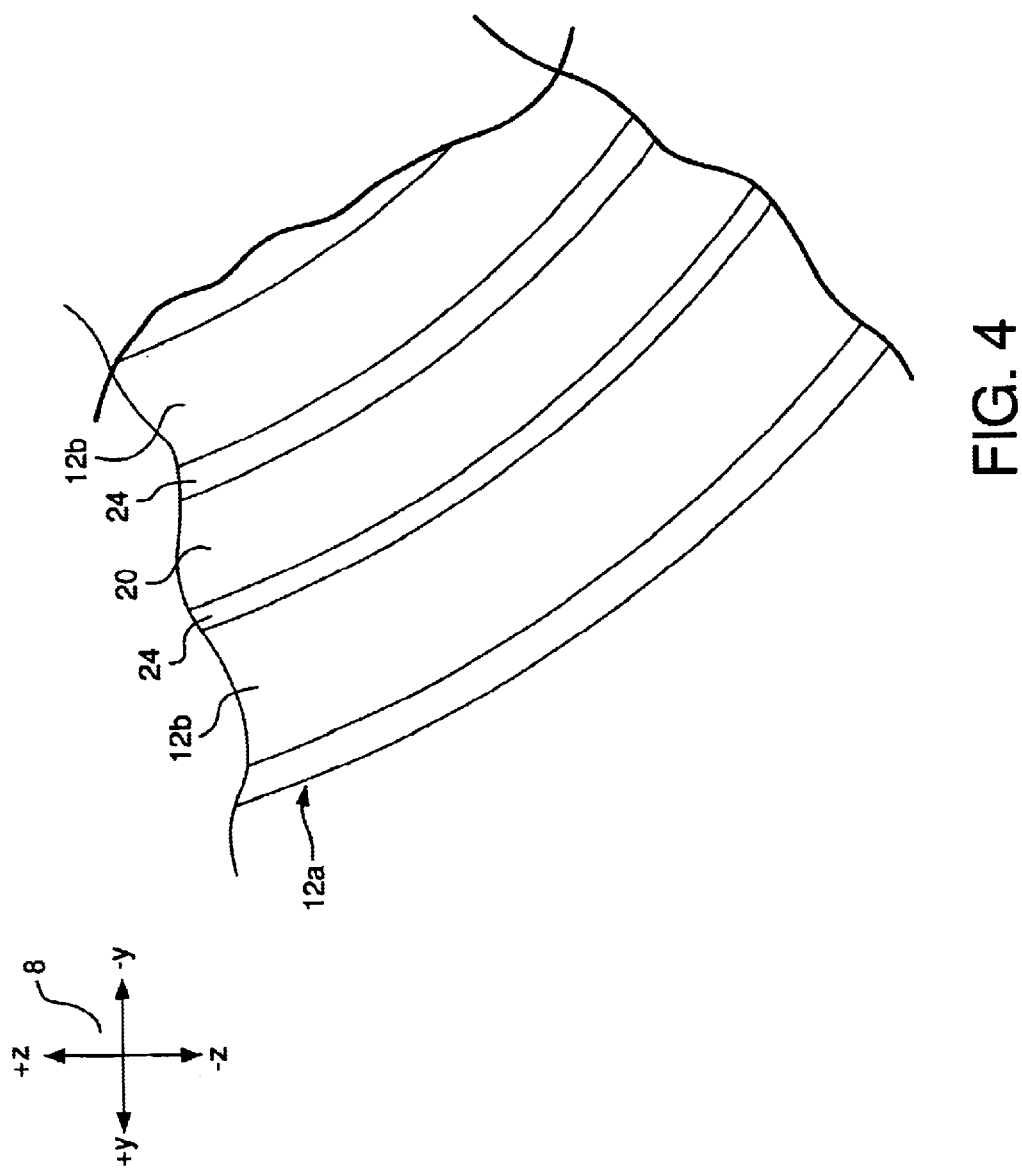
FIG. 4 is a magnified view of the area designated "B" in FIG. 2, rotated ninety degrees from the perspective of FIG. 2.
Figure 5:
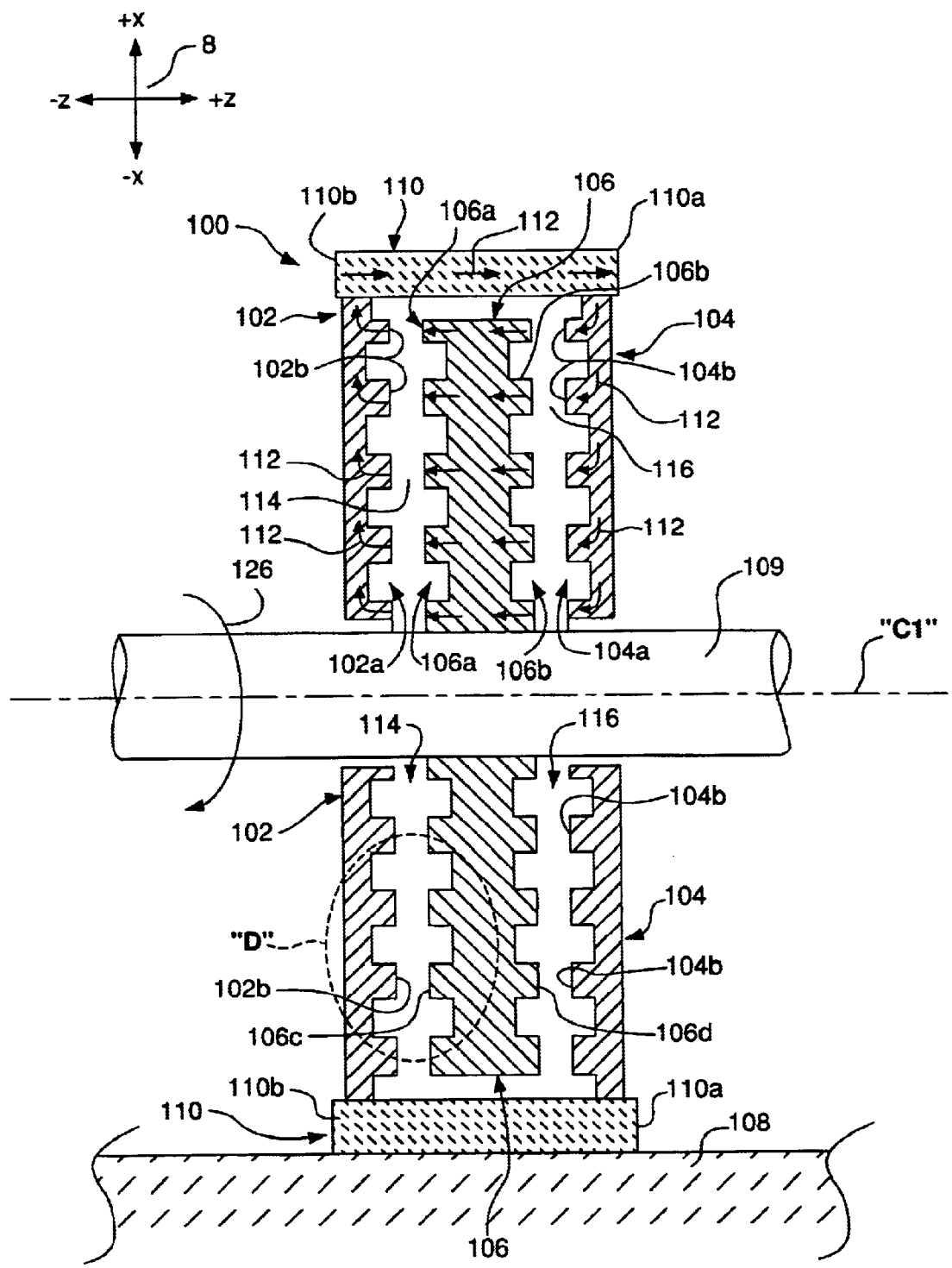
FIG. 5 is a diagrammatic side view, in longitudinal cross section, of a conventional passive radial magnetic bearing.

The flux focusing magnets 20 are preferably formed as continuous rings each having a substantially square cross-section (see FIGS. 2 and 3). Each flux focusing magnet 20 is adapted to fit within a corresponding valley 24 with minimal clearance between the flux focusing magnet 20 and the adjacent surfaces of the teeth 14b. The flux focusing magnets 20 are fixedly coupled to the surface 14a by a suitable means such as bonding. The flux focusing magnets 20 may be formed from magnetic materials such neodimium iron boron or sumarium cobalt.

The magnetization vector of each flux focusing magnet 20 is oriented substantially in the axial ("z") direction (the magnetization vector is represented by the arrows 26 included in FIG. 3). Furthermore, the flux focusing magnets 20 are positioned so that the magnetization vector acts in a direction opposite the local magnetic flux in the primary magnetic circuit In other words, the magnetic flux produced by each flux focusing magnet 20 is oriented in a direction opposite the direction of the magnetic flux in the adjacent teeth 14b. Note: The optimal value for the magnetic flux produced by the flux focusing magnets 20 is application-dependent. Hence, a specific value for this parameter is not provided herein.

Applicant has found that the use of the flux focusing magnets 20 in the above-described manner substantially reduces the leakage of magnetic flux from the primary flux circuit of the bearing 10. In particular, the flux focusing magnets 20 inhibit leakage of the primary magnetic flux from the teeth 14b by creating a localized magnetic field that acts in a direction opposite the primary magnetic field flowing through the teeth 14b. This localized magnetic field, in effect, focuses the primary magnetic flux in the desired direction, i.e., toward the gap 17 and the teeth 16d of the rotor disk 16.

Applicant has determined through experimentation that the radial stiffness of a magnetic bearing such as the bearing 10 can be doubled though the use of the flux focusing magnets 20. In other words, the magnetomotive force generated by the flow of magnetic flux between the teeth 12b, 14b, 16c, 16d can be can be substantially increased by inhibiting the leakage of flux therefrom using the flux focusing magnets 20.

The use of the flux focusing magnets 20 in a magnetic bearing such as the magnetic bearing 10 can thus increase the amount of radial stiffness achievable with a given level of primary magnetic flux. Alternatively, the flux focusing magnets 20 permit a given radial stiffness to be achieved with a lower level of primary magnetic flux. Hence, the permanent magnet that supplies the primary flux can be downsized, leading to potential reductions in the size, weight, and expense of the bearing.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention.

For example, the magnetic bearing 10 has been described in detail for illustrative purposes only. The principles of the invention can be applied to passive radial magnetic bearings of virtually any configuration. For example, the principles of the invention can be applied to bearings having a different number and arrangement of stator disks, rotor disks, and permanent magnets in comparison to the magnetic bearing 10 described herein. The principles of the invention can also be applied to bearings in which the permanent magnet that provides the primary magnetic flux is fixed to the rotor disk rather than the stator disks.

What is claimed is:

1. A radial magnetic bearing comprising:
   a rotor disk having a first plurality of concentric teeth extending from a first surface thereof;
   a first stator disk having a second plurality of concentric teeth extending from a surface thereof, the second plurality of concentric teeth being spaced apart from the first plurality of concentric teeth by a gap that permits a primary magnetic flux to flow between the first and the second plurality of concentric teeth substantially in a first direction;
   a second stator disk having a third plurality of concentric teeth extending from a surface thereof;
   a primary magnet magnetically coupled to at least one of the rotor disk and the first stator disk and provides the primary magnetic flux;
   a first plurality of flux focusing magnets fixedly coupled to at least one of the first surface of the rotor disk and the surface of the first stator disk and producing a secondary magnetic flux that flows substantially in a second direction substantially opposite the first direction; and
   a second plurality of flux focusing magnets each being fixedly coupled to one of a second surface of the rotor disk and the surface of the second stator disk, wherein the rotor disk has a fourth plurality of concentric teeth extending from the second surface thereof and being spaced apart from the third plurality of concentric teeth by a second gap that permits the primary magnetic flux to flow between the third and the fourth pluralities of concentric teeth substantially in the first direction, and the second plurality of flux focusing magnets produce the secondary magnetic flux that flows substantially in the second direction.

2. The radial magnetic bearing of claim 1, wherein each of plurality of flux focusing magnets has a substantially square cross section.

3. The radial magnetic bearing of claim 1, wherein each of plurality of flux focusing magnets is substantially ring shaped.

4. The radial magnetic bearing of claim 1, wherein the plurality of flux focusing magnets are positioned in valleys defined by adjacent ones of the first and second pluralities of concentric teeth.

5. The radial magnetic bearing of claim 1, wherein the rotor disk being rotating about an axis of rotation and the and rotor disk and the stator disk are spaced apart along the axis of rotation.

6. The radial magnetic bearing of claim 1, wherein the rotor disk has only four of the concentric teeth extending from the surface thereof and the stator disk has only four of the concentric teeth extending from the surface thereof.

7. The radial magnetic bearing of claim 1, wherein the flux focusing magnets are formed from one of neodimium iron boron and a sumarium cobalt.

8. The radial magnetic bearing of claim 1, wherein the plurality of flux focusing magnets are fixedly coupled to the at least one of the surface of the rotor disk and the surface of the stator disk by bonding.

9. A radial magnetic bearing comprising:
   a rotor disk rotating about a predetermined axis and having a first and a second circumferentially-extending raised portion projecting from a first surface thereof;
   a first stator disk axially spaced from the rotor disk and positioned around the predetermined axis, the first stator disk having a third and a fourth circumferentially-extending raised portion projecting from a surface thereof;
   a permanent magnet magnetically coupled to at least one of the rotor disk and the first stator disk and providing a primary magnetic flux;
   a first ring-shaped magnet positioned between the first and the second raised portions;
   a second ring-shaped magnet positioned between the third and the fourth raised portions;
   a second stator disk having a fifth and a sixth circumferentially-extending raised portion projecting from a surface thereof;
   a third ring-shaped magnet; and
   a fourth ring-shaped magnet, wherein the rotor disk has a seventh and an eighth circumferentially-extending raised portion projecting from a second surface thereof, the third ring-shaped magnet is positioned between the fifth and the sixth raised portions, and the fourth ring-shaped magnet is positioned between the seventh and the eighth raised portions.

10. The radial magnetic bearing of claim 9, wherein the first and the second ring-shaped magnets each have a substantially square cross section.

11. The radial magnetic bearing of claim 9, wherein the plurality of ring-shaped magnets are positioned in valleys defined by adjacent ones of the first and second pluralities of concentric teeth.

12. The radial magnetic bearing of claim 9, wherein the flux focusing magnets are formed from one of neodimium iron boron and a sumarium cobalt.

13. The radial magnetic bearing of claim 9, wherein the first and the second ring-shaped magnets are fixedly coupled to the respective surfaces of the rotor disk and the stator disk by bonding.

14. A radial magnetic bearing comprising:
- a rotor disk rotating about an axis of rotation and having a first plurality of circumferentially-extending raised portions formed thereon, for conducting a primary magnetic flux substantially in a first direction;
- a stator disk positioned around the axis of rotation and axially spaced from the rotor disk, the stator disk having a second plurality of circumferentially-extending raised portions formed thereon for conducting the primary magnetic flux substantially in the first direction;
- a primary magnet magnetically coupled to at least one of the rotor disk and the stator disk and provide the primary magnetic flux;
- a first plurality of flux focusing magnets each being positioned between adjacent ones of the first plurality of raised portions and each being polarized in a direction substantially opposite the first direction; and
- a second plurality of flux focusing magnets each being positioned between adjacent ones of the second plurality of raised portions and each being polarized in the direction substantially opposite the first direction.

15. The radial magnetic bearing of claim 14, wherein each of the flux focusing magnets has a substantially square cross section.

16. The radial magnetic bearing of claim 14, wherein each of the flux focusing magnets is substantially ring shaped.

17. The radial magnetic bearing of claim 14, wherein the plurality of flux focusing magnets are positioned in valleys defined by adjacent ones of the first and second pluralities of raised portions.

* * * * *